United States Patent [19]
Weidler et al.

[11] Patent Number: 4,845,589
[45] Date of Patent: Jul. 4, 1989

[54] BUS BAR CONNECTOR ASSEMBLY

[75] Inventors: Charles H. Weidler, Lancaster; James H. Wise, Palmyra, both of Pa.

[73] Assignee: AMP Incorporated, Harrisburg, Pa.

[21] Appl. No.: 169,514

[22] Filed: Mar. 17, 1988

Related U.S. Application Data

[63] Continuation-in-part of Ser. No. 46,479, May 4, 1987, abandoned, which is a continuation-in-part of Ser. No. 880,238, Jun. 30, 1986, abandoned.

[51] Int. Cl.⁴ .............................................. H02B 1/04
[52] U.S. Cl. ................................ 361/342; 200/51 R; 439/247; 439/251; 361/391
[58] Field of Search .............. 174/71 B; 361/342, 378, 361/338, 341, 342, 356, 361, 390, 391, 428; 200/50 AA, 51 R; 439/258, 259, 247, 251, 374, 249, 620, 701, 114, 212, 213, 246, 248

[56] References Cited

U.S. PATENT DOCUMENTS

| | | | |
|---|---|---|---|
| 3,201,556 | 8/1965 | Baird | 439/251 |
| 3,264,601 | 8/1966 | Hartholz | 439/701 |
| 3,398,327 | 8/1968 | Ferris | 361/341 |
| 3,678,237 | 7/1972 | Rickert | 200/259 |
| 3,746,936 | 7/1973 | Coffey | 361/341 |
| 4,274,701 | 6/1981 | Bannert | 439/246 |
| 4,374,603 | 2/1983 | Fukunaga | 439/248 |
| 4,502,097 | 2/1985 | Takahashi | 361/391 |

*Primary Examiner*—Gerald P. Tolin
*Attorney, Agent, or Firm*—Katherine A. Nelson

[57] ABSTRACT

A bus bar assembly comprises a frame in which circuit modules are slidable on rails towards and away from a power bus bar. Each module has a receptacle for receiving the bus bar when the module has been slid to a home position in the frame. Each receptacle is secured to a guide fork for guiding the receptacle into mating relationship with the bus bar, the guide fork being fixed to a slide block mounted on the module for sliding movement transversely of the rails to take up play between the module and the rails.

19 Claims, 7 Drawing Sheets

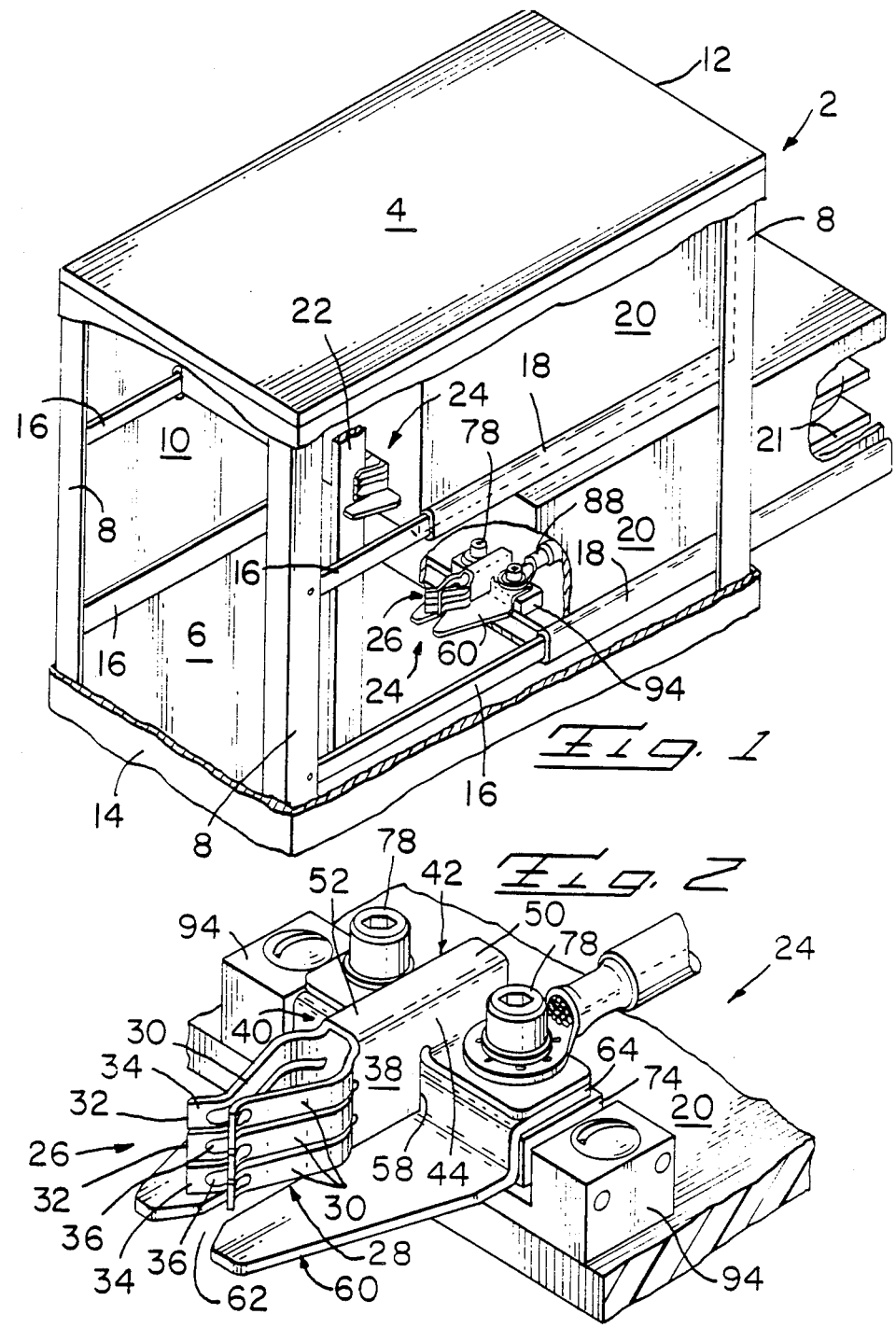

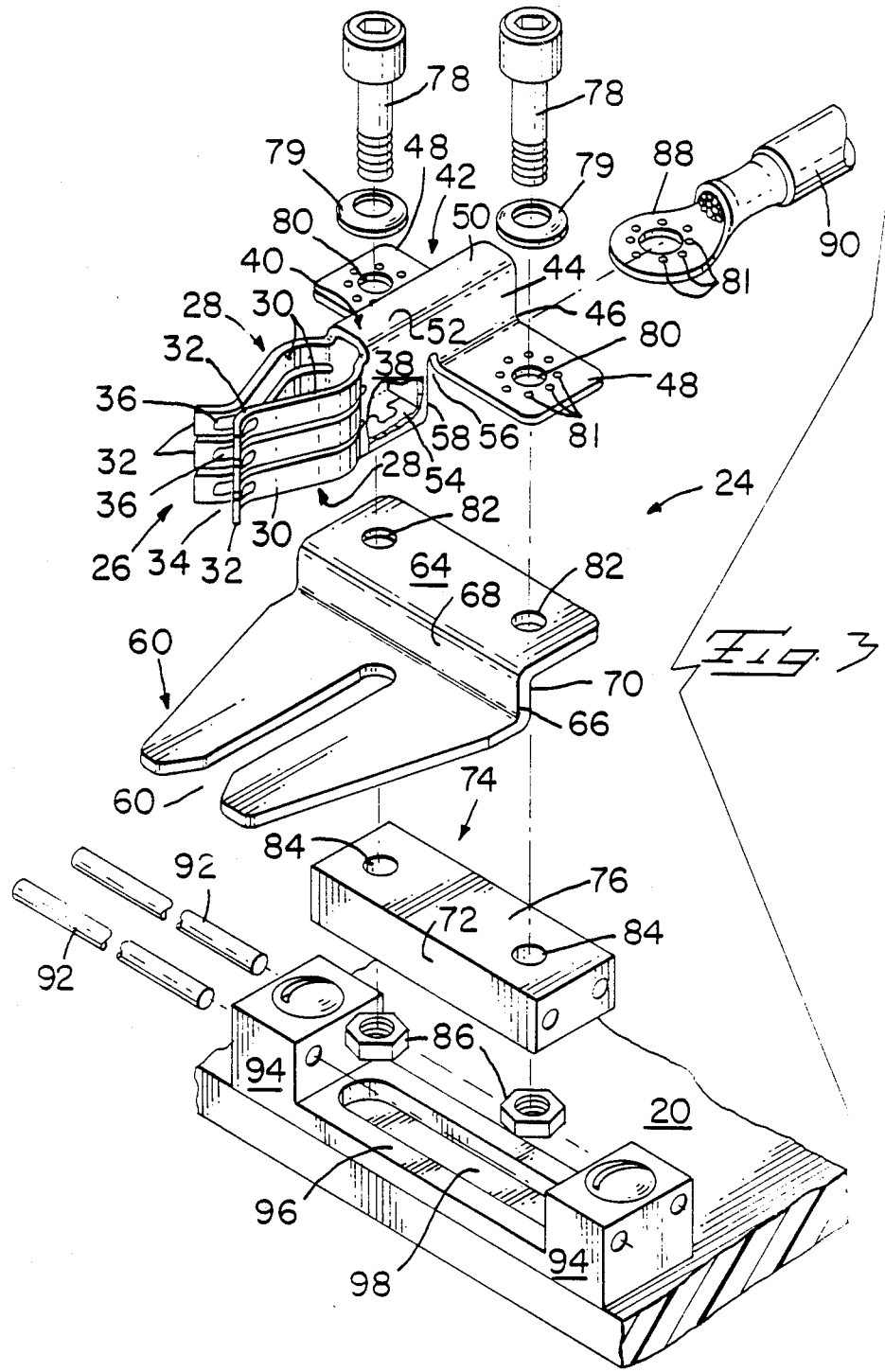

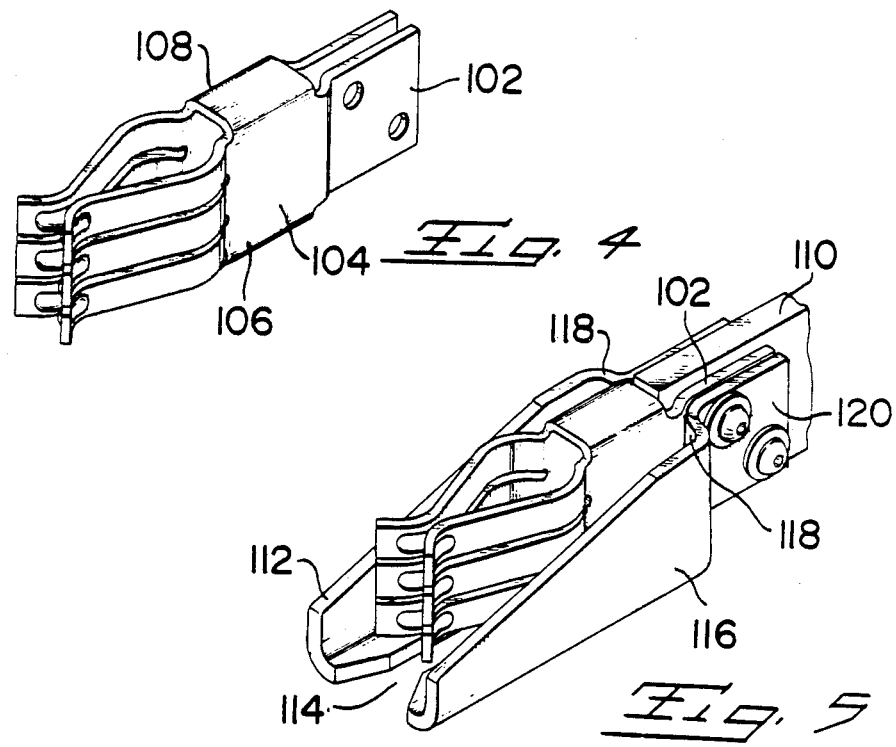

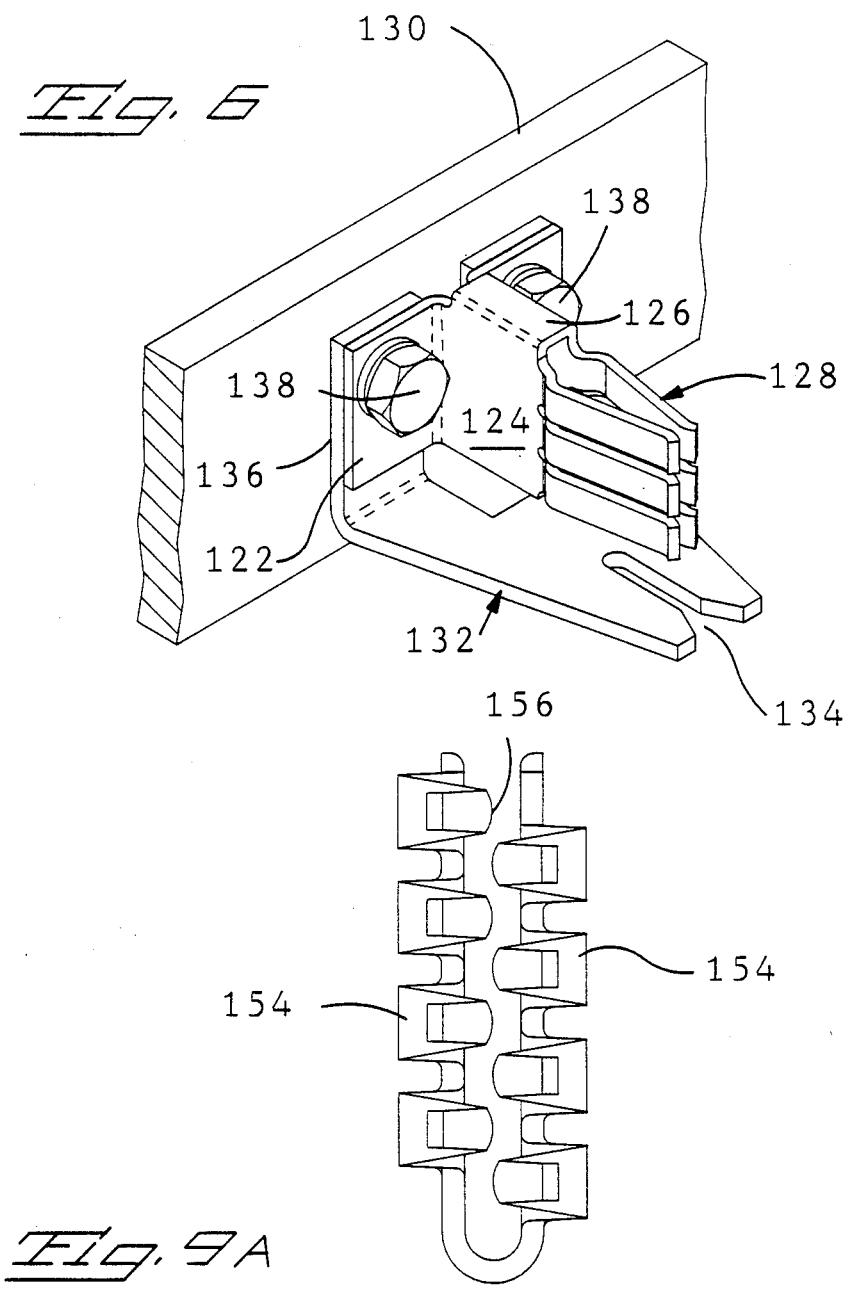

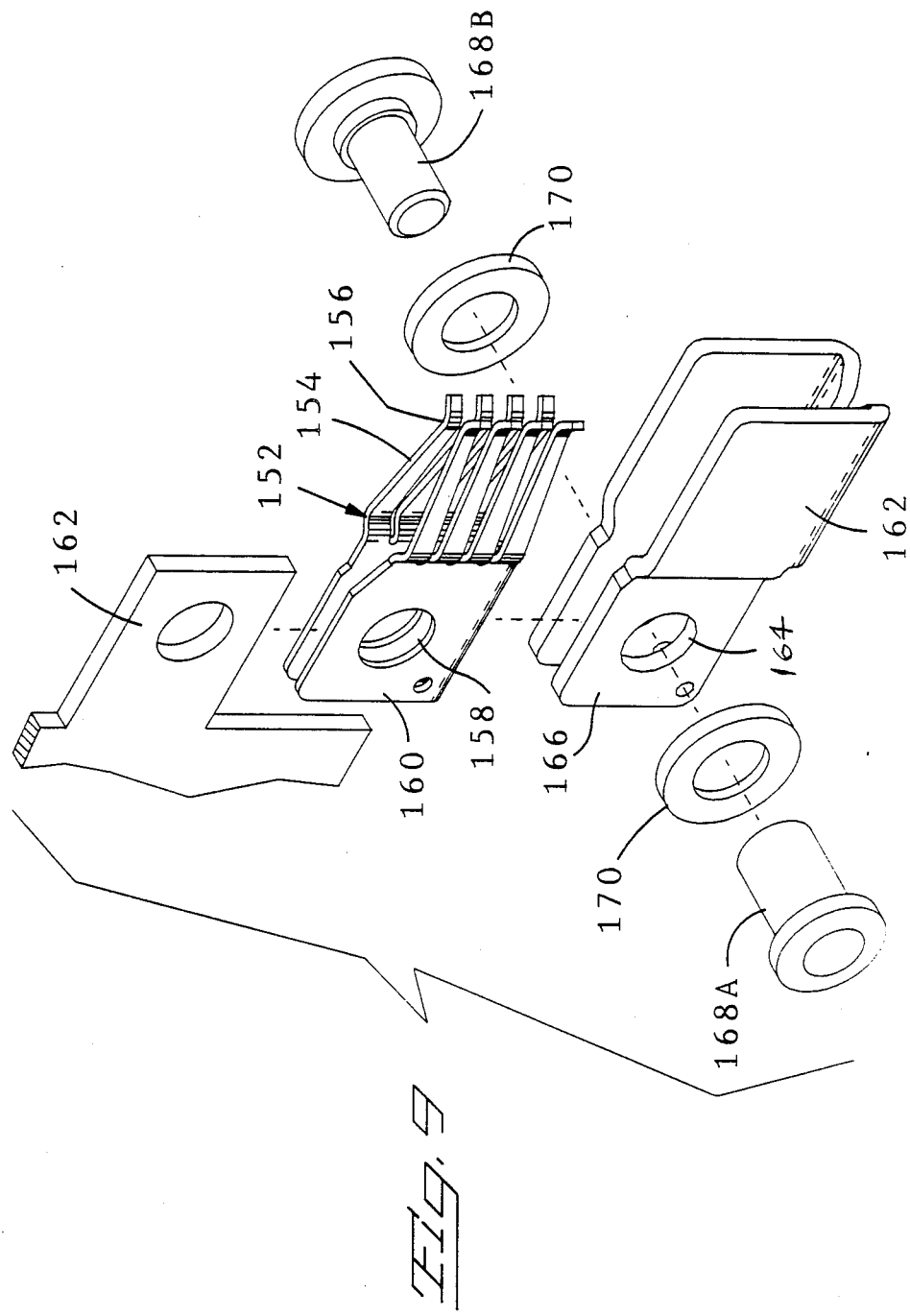

BUS BAR CONNECTOR ASSEMBLY

This application is a continuation-in-part of Application Ser. No. 07/046,479, filed May 4, 1987, which is a continuation-in-part of Application Ser. No 880,238, filed June 30, 1986, both now abandoned. This application is related to U.S. Application Ser. No. 880,231, filed June 30, 1986 and issued as U.S. Pat. No. 4,684,191 on Aug. 4, 1987, now abandoned.

FIELD OF THE INVENTION

This invention relates to an electrical bus bar connector assembly, and also relates to an electrical receptacle for use in such an assembly.

BACKGROUND OF THE INVENTION

A bus bar connector assembly may comprise a frame, for example an electrical module in which a bus bar is fixedly mounted, a drawer mounted power supply unit, being slidable in the frame towards and away from the bus bar, and having means for connecting circuitry in the module with the bus bar, for the supply of power to the bus bar. The electrical circuitry of such a module may be constituted, for example, by printed circuit boards mounted in superposition in the module. Conventionally, an electrical lead extending from the module has been secured to the bus bar by means of bolts, to connect the circuitry to its bus bar. The disconnection of the module from the bus bar, in order to allow repair work to be carried out on the module, and subsequent reconnection of the module to the bus bar were, therefore, time consuming. Furthermore, the threaded connection between the lead and the bus bar was subjected to temperature cycling owing to the heat generated by the module, thus causing the bolt to loosen as a result of differential expansion between the metal of the bolt and that of the bus bar, thereby necessitating periodical readjustment of the bolt.

SUMMARY OF THE INVENTION

In accordance with the invention, a connector assembly comprises a frame; bus means within the frame; an electrical module mounted for movement within the frame along a path in a first direction towards and away from said bus means; first and second contact means, one contact means being a bar shaped member and the other being a receptacle member; and guide means secured to at least one of said first and second contact means for initial engagement with the other of the first and second contact means, and for urging the first and second contact means in alignment for electrical and mechanical engagement. The bar shaped contact extends in a second direction transverse to said path and is oriented edgewise with respect to said path. The receptacle contact member is adapted to be electrically connected to said bar shaped member upon movement of said electrical module along said path. The first contact means is electrically connected to said electrical module. At least one of said first and second contact means is mounted to an associated one of said frame and said module respectively for limited floating movement in a third direction orthogonal to said first and second directions.

In accordance with one embodiment of the invention, the module is provided with the electrical receptacle connected to the circuitry thereof, for mating with the bus bar as the module is pushed home into the frame towards the bus bar. Since the rails on which such modules are usually mounted in the frame, there must be some play transversely of the direction of movement of the module if it is to be movable freely in the frame. The receptacle, therefore, is provided with a guide fork, which is fixed thereto and which has a mouth projecting beyond the receptacle in its direction of movement towards the bus bar, for guiding the receptacle into mating relationship therewith. For many applications, the guide fork will provide sufficient means to move the contact means mounted to the drawer into alignment with the stationary bus bar. Additional movement may be provided by float mounting one of the contact members. In one embodiment the receptacle and the guide fork are mounted to the module unit to float transversely of the direction of movement of the module to allow the guide fork to take up the play. In the absence of the guide fork, and of the provision for the transverse floating movement of the receptacle and the guide fork, with respect to the module, the receptacle could, as a result of said play, butt against the bus bar, instead of mating therewith, with consequent damage to the receptacle, and possibly also the bus bar.

In this embodiment, the receptacle is mounted to the guide fork through a stepped support structure from which spring contacts of the receptacle project, the guide fork being carried by a stepped support plate which is complimentary with said support structure and interfits therewith, the support plate also interfitting with a rectangular slide block to which the support structure and the support plate of the guide fork are secured in stacked relationship, for example by means of bolts passed through flanges projecting from the support structure. The slide block may be mounted on rails carried by a pair of spaced cheeks fixed to the module, for sliding movement substantially at right angles to the direction of movement of the module.

In another embodiment of the invention, the receptacle and guide fork members are mounted to the bus means of the frame. The receptacle may be mounted directly to the bus bar means, since the guide fork itself provides means to guide and direct the bus contact member into alignment with the receptacle contact, thus preventing damage to either member. Alternatively the members may be mounted with the same type of floating mount system as previously described. A bar shaped contact member is mounted to the moving module.

It is to be understood that the bus means may be mounted in a vertical or horizontal orientation within the frame in that the receptacle and bar shaped contact members are oriented accordingly.

The invention also relates to a receptacle unit comprising a contact spring support structure and a flange support, and which is stamped and formed from a single piece of sheet metal stock.

For a better understanding of the invention and to show how it may be carried into effect, reference will now be made by way of example to the accompanying drawings in which:

BRIEF DESCRIPTION OF THE DRAWINGS

FIG. 1 is a perspective view, with parts removed, of a rack and frame including an electrical bus bar connector assembly;

FIG. 2 is an enlarged perspective view showing details of the assembly of FIG. 1; and FIG. 3 is a perspective exploded view of the details shown in FIG. 2;

FIG. 4 is a perspective view of an alternative embodiment of a forked contact member;

FIG. 5 is a perspective view of the alternative embodiment of the fork contact member shown in FIG. 4 assembled with an alternative guide member and mounted on an end of a bus bar member;

FIG. 6 is a perspective view of a further alternative example of the forked contact member and guide member mounted to a bus bar member;

FIG. 9 is an exploded view of a further alternative forked contact member wherein the springed contact arms on opposed sides of the fork are in a stagger relationship;

FIG. 9A is a top plan view of the forked portion of the contact of FIG. 9.

DETAILED DESCRIPTION OF THE DRAWINGS

Figure 7:
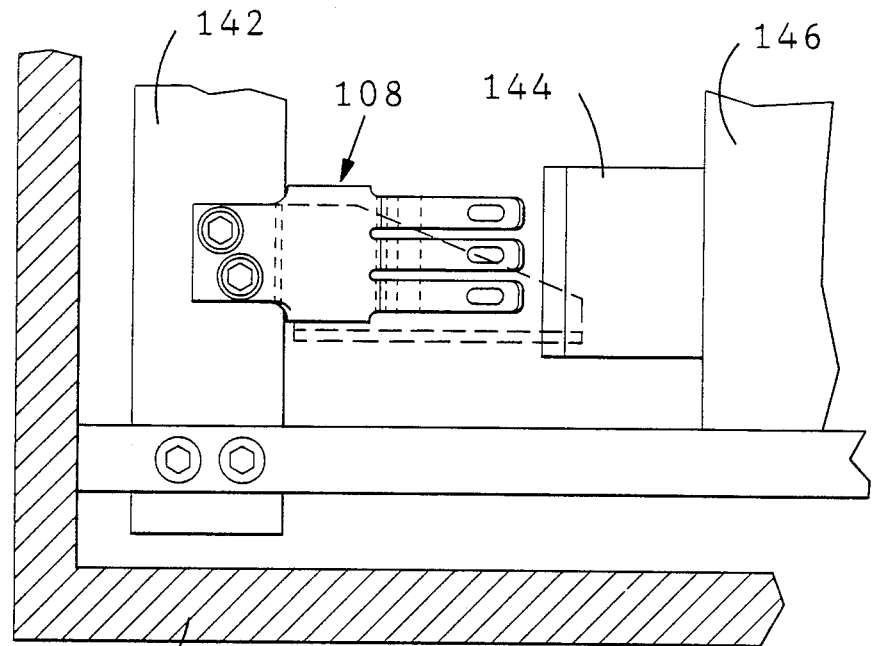
FIG. 7 is a fragmentary enlarged portion of an alternative embodiment of a rack and frame assembly having the receptacle contact member mounted to a vertically oriented bus bar member.

As shown in FIG. 1, the assembly of this embodiment comprises a rack frame 2 having a top wall 4 and a base 6 connected by vertical uprights 8, and side walls 10 (only one of which is shown). The frame 2 has a first end 12 and a second end 14, horizontal vertically spaced rails 16 spanning the uprights 8 and extending between ends 12 and 14. Electrical modules 20 are mounted on gibs 18 engaged about the rails 16, for sliding movement towards and away from second end 14. Modules 20 contain circuit boards 21 for carrying the circuitry of a power supply unit. Bus bar 22 for providing a common power supply conductor for the slidable modules 20 is positioned in a vertical orientation proximate to the end 14 of the frame 2, nearest to end 14 of frame 2. An electrical receptacle stack 24 for mating with the bus bar 22 is secured to the end of each module 20. The upper module 20 is shown in FIG. 1 in a position in which it has been advanced towards end 14 of frame 2 to mate its receptacle stack 24 with bus bar 22. Lower module 20 is shown in a position in which it is withdrawn from end 14 of frame 2.

As shown in FIGS. 2 and 3, each stack 24 comprises an electrical receptacle 26 having a set of three superposed tulip-shaped contacts 28 each comprising a pair of spring contact arms 30, the contacts 28 being symmetrical about a common vertical plane. Proximate to their free ends 32, the contact arms 30 of each pair define a bus bar receiving mouth 34 proximate to their free ends, mouth 34 being intersected by the vertical plane. Arms 30 of each contact 28 have opposed, bus bar engaging, contact surfaces 36. It is to be understood that receptacle 26 is not limited to three pairs of contact arms 30.

At the opposite end of a free end 32, each arm 30 is formed integrally with a box-shaped, tubular, contact support structure 40, which in turn is formed integrally with a flange support structure 42. Coplanar mounting flanges 48 project from the lower edges 46 of side walls 44 of structure 42, side walls 46 extending from a base 50 of the structure 42. Side walls 38 of the structure 40, are of equal height and constitute major side walls of the structure 40, these being connected by upper and lower minor walls, 52 and 54, respectively. Wall 52 merges with the base 50 of the support structure 42 which is U-shaped as seen in cross section. Walls 38 are of considerably greater height than walls 44, so that structure 40 presents a shoulder 58 below flanges 48. Receptacle 28, and structures 40 and 42 have been stamped and formed from a single piece of sheet metal, edge portions of which have been secured together to form wall 54, by means of a tongue and slot connection, as shown in FIG. 3.

Stack 24 further comprises a guide fork 60 having a receptacle guiding mouth 62 projecting, as shown in FIGS. 1 and 2, beyond the free ends 32 of the spring arms 30, towards the end 14 of the frame 2. Fork 60, is formed integrally with a guide fork support plate 64 to which it is connected by way of a vertical step 66. Shoulder 58 of structure 40 engages one side 68 of the step 66, the other side 70 of the step 66 being in surface to surface engagement with a front surface 72 of a slide block 74, the upper surface 76 of which is engaged by support plate 64. Receptacle 26, fork 60, and block 74, are fixedly connected together in vertically superposed relationship, by means of bolts 78, which extend through mounting holes 80 in flanges 48, mounting holes 82 in plate 64 and mounting holes 84 in slide block 74, and on which bolts 78 and nuts 86 have been threaded and tightened. One of bolts 78 also passes through a ring tongue terminal 88 crimped to a lead 90, to connect the receptacle 26 to the circuitry of the corresponding module 20. Bolts 78 are provided with Belleville lock washers 79 to maintain the integrity of connection between receptacle 26, fork 60 and block 74, as well as the integrity of the interface between terminal 88 and corresponding flange 48 of receptacle 26. Terminal 88 and said flange 48 are provided with antirotation bosses 81, to restrain relative rotation there between.

Slide block 74 is mounted on rails 92 extending through spaced cheeks 94 bolted to the corresponding module 20, and being connected by a web 96. The nuts 86 are received in a slot 98 of web 96, which extends parallel with the rails 92. Block 74 is capable of floating sliding movement along the rails 92, in a direction at right angles to rails 16 of the frame 2, to an extent limited by the cheeks 94.

When a module 20 is to be connected to bus bar 22, it is slid along respective rails 16, towards end 14 of the frame 2, so that bus bar 22 is received in mouth 62 of fork 60 despite play between rails 16 and corresponding gibs 18. Receptacle 26 is thereby guided with respect to bus bar 22, so that the latter is received in the mouths 34 of the contacts 28 and then between the contact surfaces 36 of the receptacle 26 as the module 20 reaches its home position in the frame 2. Each module 20 is accordingly rapidly connectable to the bus bar 22, damage to receptacle 26 or to bus bar being avoided by reason of the guiding action of the guide fork 60 and the slidability of the block 74. Thus it can be seen that the module moves along a path in a first direction; the bus bar is disposed in a second direction, perpendicular to the path; and the guide means moves the receptacle in a third direction that is orthogonal to both the first and second directions.

In an alternate example of the connector assembly shown in FIGS. 4 and 5, mounting flanges 102 project rearwardly in parallel relation from opposite major side walls 104 of a box-shaped, tubular contact support structure 106 of receptacle member 108, enabling flanges 102 to be secured to a bus bar 110 or other suitable structure received between them. In this example, guide fork 112 is bent into channel form with the guiding mouth 114 extending into the channel base and the channel walls 116 being of increasing height as they extend rearwardly where portions 118 are bent in towards each other. Supporting plates or mounting flanges 120 project rearwardly in parallel relation from free inner ends of the portions 118 for securing to the mounting flanges 102 and bus bar 110 received between them.

In a further alternative embodiment of the connector assembly shown in FIG. 6, mounting flanges 122 extend outwardly in opposite directions from major side walls 124 of box-shaped, tubular contact support structure 126 of receptacle member 128, enabling flanges 122 to be secured to a bus bar member 130 or other suitable structure. In this example, guide fork 132 is an essentially flat member having a guiding mouth 134 at one end and upwardly extending mounting flanges 136 at the other. Receptacle mounting flanges 122 and guide-fork mounting flanges 136 are adapted to receive mounting means 138 for mounting to bus bar 130.

Figure 7A:
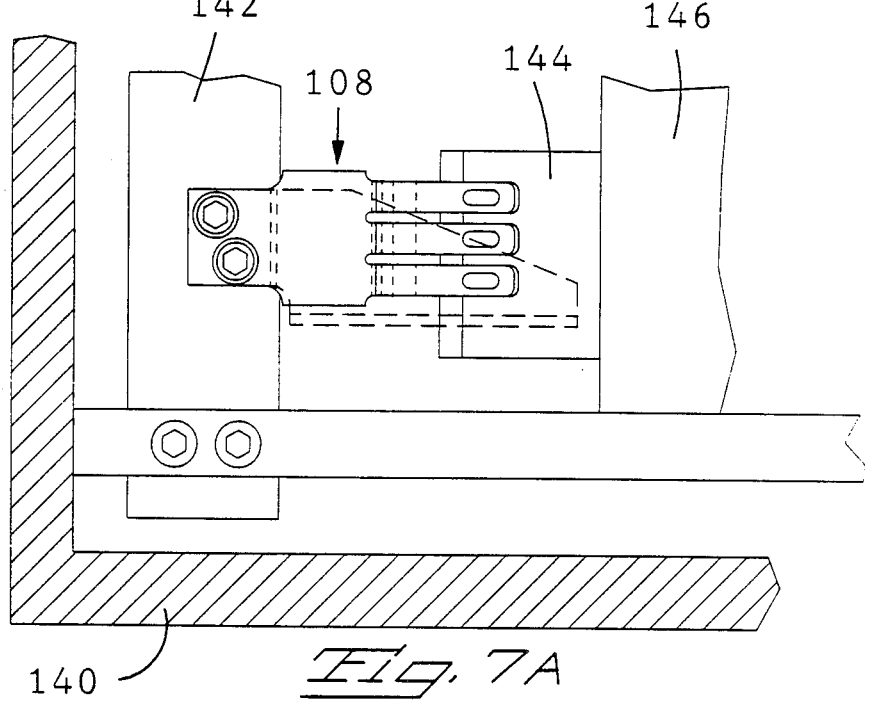
FIG. 7A is a view similar to that of FIG. 7 showing the receptacle and bar contact members in the mated position.

FIGS. 7 and 7A is a fragmentary view of an alternative embodiment of the bus bar connector assembly wherein receptacle member 108 shown in FIGS. 4 and 5, is mounted directly to vertical bus bar member 142 in frame 140. Bar contact member 144 is mounted to drawer member 146. FIG. 7 shows receptacle number 108 as bar contact member 144 enters into engagement with the forked guide member 112, shown in phantom. FIG. 7A shows receptacle 108 and bus contact members 144 in electrical and mechanical engagement, with the guide fork 112 again being shown in phantom.

Figure 8:
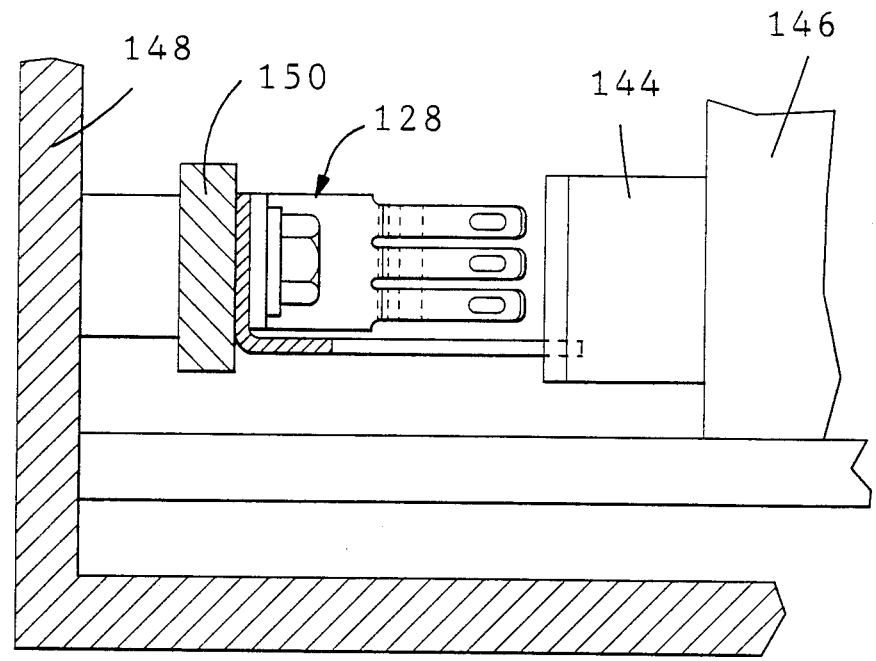
FIG. 8 is a top plan view of a fragmentary enlarged portion of an alternative embodiment of a rack and frame assembly having the receptacle contact member mounted to a horizontally oriented bus bar member.
Figure 8A:
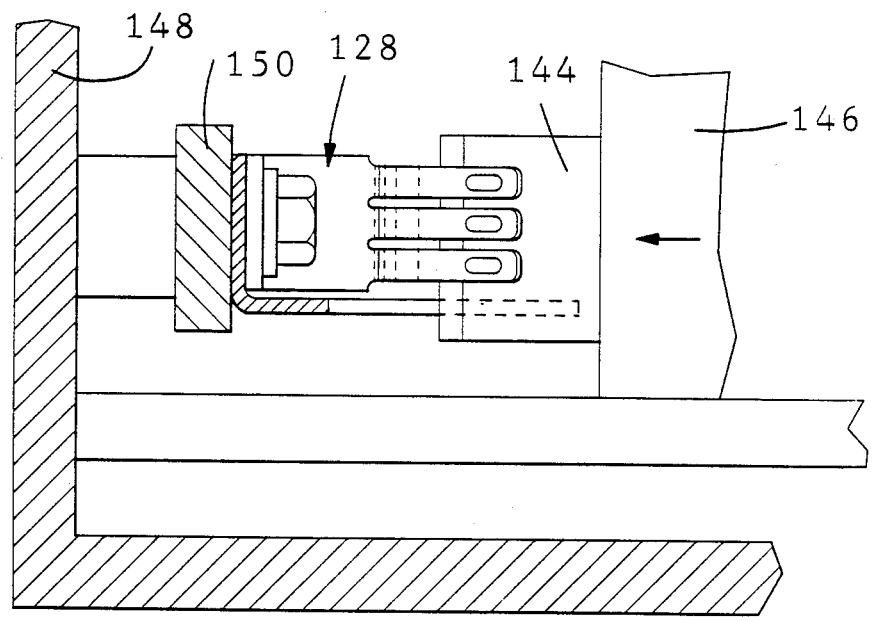
FIG. 8A is a view similar to that of FIG. 8 showing the receptacle and bar contact members in the mated position.

The embodiment shown in FIGS. 8 and 8A is similar to that of FIGS. 7 and 7A with the exception that receptacle member 128, shown in FIG. 6, is mounted to a horizontal bus bar 150 in frame 148. Bar contact member 144 is mounted to drawer member 146. FIG. 8 shows receptacle number 128 as bar contact member 144 enters into engagement with the forked guide member 132, shown in phantom. FIG. 8A shows receptacle 128 and bus contact members 144 in electrical and mechanical engagement, with the guide fork 132 again being shown in phantom.

FIG. 9 shows alternative embodiment 152 of the receptacle member in which the contact arms 154 are formed in a staggered relationship as best seen in FIG. 9A. By staggering contact arms 154, a greater deflection of the arms can be achieved, thus increasing the normal force against a bar shaped member. This arrangement is particularly suitable when the bus bar or bar shaped member is a relatively thin member.

FIG. 9 further illustrates the preferred means for mounting a contact member to its support surface. Contact member 152 includes aperture 158 in rearwardly extending mounting flange 160. Forked guide member 162 includes corresponding aperture 164 in rearwardly extending mounting flanges 166. Electrical fastening means comprises male and female fastening members 168A, 168B of the type disclosed in copending U.S. patent application Ser. No. 06/907,357, now pending. The fastening means further includes a pair of Bellville lock washers 170, which function to distribute the pressure zone across a larger surface area of respective conductive members to achieve better electrical contact. In addition, the elasticity of the washers accommodates variations in tolerance, thus permitting fastening members 168A, 168B to have a constant "shut height".

It is thought that the bus bar connector assembly of the present invention and many of its intended advantages will be understood from the foregoing description. It will be apparent that various changes may be made, construction and arrangement of the parts thereof without departing from the spirit or scope of the invention or sacrificing all its material advantages. The form herein described is merely a preferred or exemplary embodiment thereof.

I claim:

1. A connector assembly comprising:
   a frame;
   bus means within said frame;
   an electrical module mounted for movement within said frame along a path in a first direction towards and away from said bus means;
   first and second contact means, one of said contact means being a bar shaped member which extends in a second direction transverse to said path and is oriented edgewise with respect to said path, and the other of said contact means being a receptacle member, said receptacle member being adapted to be electrically connected to said bar shaped member upon movement of said electrical module along said path, said first contact means being electrically connected to said electrical module, at least one of said first and second contact means being mounted to an associated one of said bus means and said module respectively for limited floating movement in a third direction orthogonal to said first and second directions; and
   guide means secured to at least one of said first and second contact means for initial engagement with means of said other of said first and second contact means for urging said one of said first and second contact means in said third direction into alignment for mechanical and electrical engagement with said other thereof.

2. The connector assembly as defined in claim 1 wherein said guide means is secured to said second contact means.

3. The connector assembly as defined in claim 1 wherein said guide means is secured to said first contact means.

4. The connector assembly as defined in claim 3 wherein said first contact means is a receptacle member.

5. The connector assembly as defined in claim 1 wherein said receptacle member is mounted to said bus means.

6. A bus bar connector assembly comprising:
   a frame;
   a bus bar fixedly mounted in the frame;
   an electrical module mounted for sliding movement in the frame along an approximately rectilinear path towards and away from the bus bar and between a first position remote from the bus bar and a second position proximate thereto;

an electrical receptacle on said module and being connected to electrical circuitry therein, for mating with said bus bar in the second position of said module;

a guide fixed to said receptacle for engagement with said bus bar for guiding said receptacle into mating relationship with said bus bar; and means supporting said receptacle and said guide for limited floating movement transversely of said path, said receptacle comprising spring fork contact means for gripping said bus bar and said guide comprising a rigid guide fork defining a guiding mouth projecting beyond said spring fork contact means in the direction of movement of said module towards said second position thereof.

7. The bus bar connector assembly as defined in claim 6, wherein said fork contact means project from, and are integrally formed with, a supporting box structure, said guide fork being formed integrally with, and projecting from, a supporting plate which is interengaged with said box structure, flanges on said box structure being secured to said supporting plate.

8. The bus bar connector assembly as defined in claim 7, wherein said supporting plate is secured to a slide block mounted on a rail extending transversely of said direction of movement between a pair of cheeks secured to said unit.

9. The bus bar connector assembly as defined in claim 8, wherein said supporting box structure is formed with a shoulder, said plate being formed with a step, said shoulder and said step extending in the direction of said rail, said shoulder being in surface-to-surface contact with one side of said step, and the other side of said step being in surface-to-surface contact with said slide block.

10. The bus bar connector assembly as defined in claim 7 wherein said bus bar is fixedly mounted in a horizontal position in said frame.

11. A bus bar connector assembly comprising:
a rack having a first and a second end;
an electrical module in a drawer mounted for horizontal sliding movement on rails in said rack, towards and away from said second end;
a vertical power bus bar secured in said rack proximate to said second end;
an electrical receptacle for mating with said bus bar and comprising a set of superposed spring contacts mounted on said drawer and having mouths facing said second end;
means for electrically connecting said spring contacts to circuitry of said module;
a rigid horizontal guide fork fixed to said receptacle and having a bus bar receiving mouth projecting beyond the mouths of said contacts and towards said second end for guiding said contacts into mating relationship with said bus bar; and
a slide block on said module, mounted for limited floating movement thereon transversely of said rails, and to which said receptacle and said guide fork are fixed.

12. The bus bar connector assembly as defined in claim 11, wherein said spring contacts project from a support box structure having mounting flanges, said guide fork having a support portion bolted to said flanges and to said slide block, nuts on said bolts projecting into a slot provided between cheeks supporting a rail upon which said slide block is mounted.

13. The bus bar connector assembly as defined in claim 11, wherein said guide fork projects from a support plate formed with a first vertical shoulder extending transversely of said rails and one side of which is engaged by a second vertical shoulder projecting from a support structure from which said spring contacts project, said slide block engaging the other side of said second shoulder, flanges on said support box structure receiving fastening means fixedly connecting said support box structure, said support plate and said slide block in vertically superposed relationship.

14. The bus bar connector assembly as defined in claim 11, wherein said slide block is slidable along rails supported in cheeks fixed in said module, a web connecting said cheeks being formed with a slot extending therebetween and receiving end portions of fasteners connecting together said receptacle, said guide fork, and said slide block in vertical superposed relationship.

15. A bus bar connector assembly comprising:
a frame;
a bus bar fixedly mounted in the frame;
an electrical module mounted for sliding movement in the frame along an approximately rectinlinear path towards and away from the bus bar and between a rear first position remote from the bus bar and a front second position proximate thereto;
an electrical receptacle on said module and being connected to electrical circuitry therein, for mating with said bus bar in the second position of said module;
a guide fixed to said receptacle for engagement with said bus bar and for guiding said receptacle into mating relationship with said bus bar; and
said receptacle comprising spring fork contact means for gripping said bus bar, said fork contact means projecting from, and integrally formed with a supporting box structure, said box structure including a shoulder, and said guide comprising a rigid guide fork defining a guiding mouth projecting beyond said spring fork contact means in the direction of movement of said module towards said second position thereof, said guide fork being formed integrally with, and projecting from, a supporting plate which is interengaged with said box structure, said box structure including flanges secured to said supporting plate, said plate being formed with a step, said shoulder of said box structure and said step extending transversely of said direction of movement, said shoulder being in surface to surface contact with one side of said step, and the other side of said step being in surface to surface contact with an edge of a planar mounting member of the module which edge faces the said direction of forward movement.

16. The bus bar assembly as defined in claim 15 wherein said fork contact means includes mounting flanges projecting rearwardly, essentially in parallel relation from a pair of opposed walls of said supporting box structure, the guide fork having a channel section with the mouth extending along the channel base and having supporting plates extending rearwardly from respective side walls of the channel such that the fork contact means and supporting box structure can be received within the channel with the mounting flanges between and adjacent respective supporting plates, means being provided to secure the supporting plates and the mounting flanges to an end of a bus bar received between the mounting flanges.

17. An electrical receptacle unit which has been stamped and formed from a single piece of sheet metal stock and which comprises:
- a plurality of superposed, two-armed, tulip-shaped spring contacts, each having a bus bar receiving mouth proximate to one end thereof;
- a tubular contact spring support structure having a pair of opposite major sides of equal height and a pair of opposite minor sides, said contact spring support structure having a first and a second end, one arm of each contact being formed integrally with a respective one of said major sides, at said first end of said contact spring support structure;
- a channel shaped flange support having a base formed integrally with one of said minor sides at said second end of the contact support structure, at said second end thereof, the height of said side walls being substantially less than that of said major sides so that said contact spring support structure presents a shoulder facing away from said first end thereof; and
- a pair of coplanar flanges each projecting outwardly from a respective one of said side walls.

18. The electrical receptacle unit as defined in claim 17 wherein said contacts are in alignment and are symmetrical about a common plane bisecting said mouths.

19. The electrical receptacle as defined in claim 17 wherein said contacts are in a staggered relationship relative to a plane bisecting said mouth.

* * * * *

UNITED STATES PATENT OFFICE
CERTIFICATE OF CORRECTION

Patent No. 4,845,589  Dated July 4, 1989

Inventor(s) Charles H. Weidler, James H. Wise

It is certified that error appears in the above-identified patent and that said Letters Patent is hereby corrected as shown below:

In column 7, line 36, claim 10, claim should refer to claim 6 not claim 7.

Signed and Sealed this

Nineteenth Day of June, 1990

Attest:

HARRY F. MANBECK, JR.

*Attesting Officer*  *Commissioner of Patents and Trademarks*